(12) United States Patent
Faitl et al.

(10) Patent No.: US 10,151,124 B2
(45) Date of Patent: Dec. 11, 2018

(54) BOWDEN CABLE

(71) Applicant: Kiekert Aktiengesellschaft, Heiligenhaus (DE)

(72) Inventors: Jan Faitl, Prelouc (CZ); Pavel Rybar, Prelouc (CZ)

(73) Assignee: Kiekert Aktiengesellschaft, Heiligenhaus (DE)

( * ) Notice: Subject to any disclaimer, the term of this patent is extended or adjusted under 35 U.S.C. 154(b) by 601 days.

(21) Appl. No.: 14/768,585

(22) PCT Filed: Feb. 15, 2014

(86) PCT No.: PCT/DE2014/000066
§ 371 (c)(1),
(2) Date: Aug. 18, 2015

(87) PCT Pub. No.: WO2014/131389
PCT Pub. Date: Sep. 4, 2014

(65) Prior Publication Data
US 2016/0002960 A1    Jan. 7, 2016

(30) Foreign Application Priority Data

Feb. 26, 2013 (DE) ........................ 10 2013 203 166

(51) Int. Cl.
*E05B 79/20* (2014.01)
*F16C 1/10* (2006.01)
(Continued)

(52) U.S. Cl.
CPC ................ *E05B 79/20* (2013.01); *B60J 9/00* (2013.01); *E05B 81/20* (2013.01); *E05B 83/36* (2013.01);
(Continued)

(58) Field of Classification Search
CPC ........... Y10S 292/60; F16C 1/22; F16C 1/223
(Continued)

(56) References Cited

U.S. PATENT DOCUMENTS 3,710,645 A    1/1973 Bennett
4,676,119 A *  6/1987 Spease ...................... F16C 1/22
                                                    74/502.6
(Continued)

FOREIGN PATENT DOCUMENTS

DE        2149278        5/1972
DE        10110516 A1 *  9/2002 ............. E05B 79/20
(Continued)

OTHER PUBLICATIONS

Machine Translation of DE10110516A1 by Lexis Nexis Total Patent on Sep. 22, 2015.
(Continued)

*Primary Examiner* — Carlos Lugo
(74) *Attorney, Agent, or Firm* — Woodard, Emhardt, Moriarty, McNett & Henry LLP (57) ABSTRACT

The invention relates to a Bowden cable, particularly for a motor vehicle lock with a locking mechanism, comprising a rotary latch and at least one pawl for locking said rotary latch in a main latching position and a pre-latching position, preferably with a closing aid for moving said rotary latch from the pre-latching position into the main latching position. The Bowden cable comprises a securing device designed such that said Bowden cable can be adjusted and fixed in place by means of a translational movement, or that this adjustment can be fixed by deformation of at least one deformation tab. This allows said Bowden cable to be mounted in a particularly simple manner.

12 Claims, 4 Drawing Sheets

(51) Int. Cl.
*F16C 1/14* (2006.01)
*E05B 81/20* (2014.01)
*B60J 9/00* (2006.01)
*E05B 83/36* (2014.01)
*E05C 1/12* (2006.01)
*F16C 1/22* (2006.01)

(52) U.S. Cl.
CPC ............... *E05C 1/12* (2013.01); *F16C 1/103* (2013.01); *F16C 1/105* (2013.01); *F16C 1/145* (2013.01); *F16C 1/22* (2013.01); *F16C 1/223* (2013.01); *F16C 2350/52* (2013.01); *Y10S 292/60* (2013.01)

(58) Field of Classification Search
USPC ...................................................... 292/1, 216
See application file for complete search history.

(56) References Cited

U.S. PATENT DOCUMENTS

| | | | | |
|---|---|---|---|---|
| 4,805,479 A | * | 2/1989 | Brightwell | F16C 1/105 74/502.4 |
| 5,163,338 A | * | 11/1992 | Sharp | F16C 1/223 403/104 |
| 5,590,567 A | * | 1/1997 | Marrs | F16C 1/105 248/67.7 |
| 5,682,797 A | * | 11/1997 | Kelley | F16C 1/226 403/11 |
| 5,706,706 A | * | 1/1998 | Kitamura | F16C 1/14 403/104 |
| 5,709,132 A | * | 1/1998 | Irish | F16C 1/14 74/501.5 R |
| 5,911,791 A | * | 6/1999 | Srinivas | F16C 1/14 74/501.5 R |
| 9,540,854 B2 | * | 1/2017 | Graute | E05B 77/34 |

FOREIGN PATENT DOCUMENTS

| | | | | |
|---|---|---|---|---|
| DE | 10110516 A1 | | 9/2002 | |
| DE | 102004002755 A1 | * | 8/2005 | ............ E05B 79/12 |
| DE | 102005059833 A1 | * | 8/2006 | ............ F16C 1/105 |
| DE | 102006059302 A1 | * | 7/2008 | ............ F16C 1/105 |
| DE | 102011108364 A1 | | 1/2013 | |
| FR | 2521659 A1 | * | 8/1983 | ............ F16C 1/105 |
| FR | 2589533 A1 | | 5/1987 | |
| JP | 4606701 B2 | * | 1/2011 | ............ F16C 1/14 |
| WO | WO 2007/120813 A2 | | 10/2007 | |

OTHER PUBLICATIONS

Machine Translation of DE102011108364A1 by Lexis Nexis Total Patent on Sep. 22, 2015.
Machine Translation of FR2589533A1 by Lexis Nexis Total Patent on Sep. 22, 2015.

* cited by examiner

BOWDEN CABLE

CROSS-REFERENCE TO RELATED APPLICATIONS

This application is the U.S. national stage Application of International Patent Application No. PCT/DE2014/000066, filed Feb. 15, 2014, which claims priority of German Application No. 10 2013 203 166.1, filed Feb. 26, 2013, which are both hereby incorporated by reference.

BACKGROUND

The invention relates to a Bowden cable, in particular, for a motor vehicle latch containing a locking mechanism comprising a catch and at least one pawl for locking the catch in a main ratchet position and in a pre-ratchet position, preferably with a closing aid for moving the catch from the pre-ratchet position to the main ratchet position. The invention also relates to a method for installing the Bowden cable.

A Bowden cable contains a Bowden cable core and a Bowden cable sheath. In most cases, the Bowden cable core is a steel cable or a wire cable. The Bowden cable sheath is generally a flexible but pressure-resistant sleeve, serving as a mechanical guide of the Bowden cable core and as a counter bearing for the tractive forces transferred by the Bowden cable core. Due to the flexibility of the Bowden cable, forces can also be transferred if the Bowden cable is bent. A Bowden cable can not only transfer a tractive force through the Bowden cable core but also a compressive force through the Bowden cable sheath in the same manner.

Such a Bowden cable is, for instance, used in motor vehicle latches with a closing aid, in order to provide an effective transfer of the forces or longitudinal movement of an actuator onto a closing pawl of a closing aid, able to move a locking mechanism from the pre-ratchet position to the main ratchet position or a motor vehicle door or flap connected to the locking mechanism between a respective pre-ratchet position and main ratchet position. Such an actuator for a closing aid for a motor vehicle door or flap moveable between a pre-ratchet position and main ratchet position is disclosed in printed matter DE 10 2011 108364 A 1.

For installation of the Bowden cable the Bowden cable is inserted and the ends of the Bowden cable core and of the Bowden cable sheath are connected to the connection parts. The Bowden cable sheath is regularly connected to the housing and the Bowden cable core to the connection parts, moveable in most cases.

Once installed and connected to the housing and/or connection parts, the Bowden cable normally has a certain play. Play refers in this instance to an unwanted difference in length, in relation to the desired state, between the Bowden cable core and/or the Bowden cable sheath or an unwanted relative positional difference between the Bowden cable core and Bowden cable sheath.

An excessive positive play would during later use interfere with the transmission of the force or longitudinal movement. Upon introduction of a force or movement in the Bowden cable, initially only the positive play would be reduced, so that the transfer of the force or movement at the other end will only occur after a delay. But also a negative play, i.e. a reduction in length in case of, for instance, a too short Bowden cable core, could adversely affect the subsequent function or capability. A too short Bowden cable core could result in a moveable connection part not being able to assume its intended position, the service life being reduced due to excessive stressing or wear to increase due to the friction between the Bowden cable sheath and Bowden cable core in tight radii of the Bowden cable.

During installation, the Bowden cable is generally adjusted in an additional work step, i.e. the play of the Bowden cable is reduced to a range of a mostly specified installation tolerance in relation to the target state. Once the Bowden cable has been adjusted, the settings of the Bowden cable, i.e. the length and length ratios of the Bowden cable sheath and Bowden cable core are fixed.

In particular in a Bowden cable with a positive connection to a connection part, e.g. by engaging a hook or a nipple, installation play must be provided to form the connection or connections. Installation play refers to play of the Bowden cable provided temporarily for the purpose of installation, without which a hook at the end of a Bowden cable core cannot be engaged. After the completed installation, the Bowden cable is re-set or tensioned in order to remove the installation play.

The tensioning direction of a Bowden cable is the direction in which the lengths and/or relative position of the Bowden cable sheath and/or Bowden cable core have to be changed in order to achieve a positive play.

In order to adjust and/or fix a Bowden cable during installation, a threaded or clamp connection is usually provided, with the aid of which the length of the Bowden cable sheaths or Bowden cable core can be adjusted and/or fixed.

In case of a threaded connection, e.g. for connecting a Bowden cable sheath to the housing, the thread pitch changes the length with each revolution and the self-locking effect of the thread for fixing.

In a clamp connection, for instance for connecting a Bowden cable core to a connection part, the desired length of the Bowden cable core is set and fixed by clamping to the connection part.

Printed matter DE 10110516 A1 discloses a connection mechanism formed by the Bowden cable for coupling a door latch to an internal locking button. Two parallel sections 76, 77 of a Bowden cable tube 7 are fixed in a mount 31. The mount 31 can be slid in longitudinal direction for setting the longitudinal position in a guide or support element 32. Symmetrically formed detent cogs 36 and a detent hook 37 ensure the fixing of the mount 31.

SUMMARY

The invention has the task of simplifying the adjustment and fixing of a Bowden cable during installation.

Unless stated otherwise below, the above characteristics of a Bowden cable can individually or combined be a part of the invention.

In order to solve this task, a Bowden cable with a fixing device is provided, which is designed in such a way that the Bowden cable can be adjusted and fixed by a translation movement or in which the fixing can be produced by the adjustment of the Bowden cable provided by the translation movement by deformation of at least one deformation tab, in particular, a plastic deformation by preferably using a tool. Translation movement refers to a movement along a straight line, extending parallel to the tensioning direction in the area of the fixing device. The provision of the inventive fixing device allows a particularly simple and quick installation without any or hardly any play. Also, a Bowden cable with the inventive fixing device can be produced with very little effort. Such a Bowden cable can be produced with very few parts.

In one embodiment of the Bowden cable with a fixing device, designed in such a way that the Bowden cable can be adjusted and fixed by a translation movement, the Bowden cable is adjusted and fixed by only a single translation movement in the tensioning direction. The Bowden cable with a fixing device, requiring only a single translation movement in tensioning direction for adjustment of the Bowden cable and for automatically fixing the setting of the Bowden cable at the end of the translation movement, allows a particularly simple installation.

In one embodiment of the Bowden cable with a fixing device that can only be adjusted and fixed by a translation movement in tensioning direction, at least one detent cog and/or at least one detent hook are provided for fixing the setting of the Bowden cable. The detent cogs and/or one or several hooks allows the user to carry out a translatory movement for adjusting the Bowden cable and ensures that the translatory position, i.e. the adjustment of the Bowden cable, is automatically fixed after the translation movement. This provides a simple and quick installation.

In one embodiment, a detent profile for locking the detent cogs and/or a guide for holding the detent hook and guiding in the translation direction, is arranged in a connection part, preferably a housing. By providing or forming the detent profile and/or the guide in the connection part, a Bowden cable with particularly few parts can be provided.

In one embodiment, the guide for holding and guiding the detent hook is provided in form of a projection or groove or a slit. The design of a guide in form of a projection or groove or a slot provides a particularly simple guide with little production effort.

In one embodiment, the detent cog and/or the detent profile has a saw-tooth shape and, in particular, such a shape that a translation movement can only be carried out in the tensioning direction. A saw-tooth shape is essentially triangular, in which a sliding leg contains a small incline allowing a sliding movement and a detent leg a steep incline to prevent a sliding movement or for locking a respective counter geometry. A saw tooth profile is created by linking several saw tooth shapes.

If the detent legs of the detent profile extend in the tensioning direction and/or the detent legs of the detent cogs against the tensioning direction, a translation movement can only be carried out in tensioning direction. In the opposite direction, the detent legs ensure locking. A saw-tooth shaped detent cog and/or formed detent profile ratchet profile thus ensure that the user can adjust the Bowden cable using only one translation movement in tensioning direction and that this setting is automatically fixed.

In many systems containing Bowden cable, the user has not enough force during installation in order to manually reduce the positive play of the des Bowden cable to zero. The installation tolerance lies in this case mostly within a range that can be observed during hand-tight tensioning.

In such systems, in particular, the inventive Bowden cable allows, a particularly simple and quick installation as a translation movement with the manual force of the operator suffices to adjust and simultaneously fix the Bowden cable.

In one embodiment of the Bowden cable containing a fixing device and that can be adjusted and fixed by a translation movement, the fixing device contains a fixing means and, in particular, only a fixing means that preferably constitutes a single piece. A single piece means that it is made from the same material by forming, for instance by an injection molding process. Using a fixing device with one or only one single-piece fixing means, a Bowden cable with a particularly small number of parts can be provided and produced with particularly little effort.

In one embodiment of the Bowden cable, the fixing means can be detachably arranged perpendicular to the tensioning direction. A fixing means that can be detachably arranged perpendicular to the tensioning direction allows the Bowden cable to first of all be randomly adjusted after which the setting can be fixed with the aid of the fixing means. A considerable installation play can thus be particularly easily provided and removed again. Such a fixing means also allows that such an adjustment and fixing produced only by a translation movement can correct the setting of the Bowden cable in both directions by releasing the fixing means perpendicular to the tensioning direction and can be fixed again by fixing the fixing means. This provides a particularly simple and flexible installation.

In one embodiment, the fixing means is positively connected to the Bowden cable core or the Bowden cable sheath in translation direction, in particular by means of a retaining lug and a respective retaining opening. Preferably the retaining lug is arranged on the Bowden cable core or on the Bowden cable sheath and/or the retaining opening on the fixing means. The provision of such a positive connection allows a particularly easy and flexible installation.

In one embodiment, the retaining lug extends longitudinally through an elongated hole in the ratchet profile and/or connection part in tensioning direction, in order to positively connect the fixing means in translation direction with the Bowden cable core or the Bowden cable sheath on the other side of the longitudinal hole. In a system with Bowden cable, having only limited access to the fixing device of the Bowden cable, the fixing means can be arranged by such a longitudinal hole in such a way that the Bowden cable can be adjusted and fixed by the user despite of the limited accessibility. This allows a particularly easy installation.

In one embodiment, the detent cogs and/or the detent hook(s) are arranged on the fixing means. This detent cog and/or detent hook arrangement on the fixing means allows for a particularly simple and easy installation.

In one embodiment, the detent hook contains a phase in fixing direction and/or can elastically change its shape. Such an elastic detent hook with a phase allows a particularly easy fixing of the detent hook to the fixing.

In one embodiment, the fixing means can only be released by a vertical movement to the tensioning direction. This provides a particularly reliable fixing.

In one embodiment, the fixing means cannot be detached from the fixing device once installed, i.e. can only be detached by destruction. A non-detachable fixing means connection can provide a particularly secure fixing.

In one embodiment, the Bowden cable core or the Bowden cable sheath contains one or more connection devices in the area of the fixing device and preferably recesses, for connecting a tool allowing adjustment of the Bowden cable. Using the at least one connecting means, the Bowden cable can be adjusted or tensioned manually or with the aid of a tool. This allows for a particularly easy installation.

In one embodiment, the Bowden cable with a fixing device designed in such a way that the setting can be fixed by deforming at least one deformation tab, a separate connection device for connecting to a connection part is provided for the installation of the Bowden cable core or the Bowden cable sheath.

By providing a connection means separated for installation, the Bowden cable and the connection means can be installed separately allowing a particularly easy installation.

The Bowden cable, i.e. one end of the Bowden cable core or of the Bowden cable sheath is then fixed to the connection means in the set position by deforming the deformation tab. In particular, in positive connections, which would otherwise require an excessive installation play for connection or a considerable installation effort, such a separate installation and connection of the connection means results in a considerable simplification of the installation process.

In one embodiment, the connection means contains a recess with a radius of the Bowden cable core or Bowden cable sheath to be connected. Such a recess acts, on one hand, as a guide during adjustment, allowing a particularly easy installation. On the other hand, such a recess increases the connection strength.

In one embodiment, the connection means contains an inspection window in the area of the recess or is designed as a half shell. With the aid of the inspection window or due to the design as a half shell in the area of the recess, the position of the Bowden cable core or of the Bowden cable sheath in relation to the connection means can be determined during installation, allowing particularly easy adjustment and installation.

In one embodiment, the at least one deformation tab is arranged on the connection means and forms preferably a single piece with the connection means. Due to the arrangement of the at least one deformation tab at the connection means, the fixing device can be provided with particularly little effort.

In one embodiment, the one or several deformation tabs are arranged tangentially on the recess, and are preferably arranged in parallel in case of several deformation tabs. A tangential arrangement of one or several deformation tabs achieves a particularly high connection strength to the Bowden cable core or the Bowden cable sheath.

In one embodiment, several deformation tabs are arranged offset on both sides of the recess. The offset arrangement of several deformation tabs on both sides of the recess achieves a particularly strong connection to the Bowden cable core or the Bowden cable sheath. It also allows the production of the connection means with particularly little effort and waste.

In one embodiment, the side facing the deformation tab contains a recess for anchoring the deformation tab after re-shaping. As a result of such a recess, a particularly strong connection to the Bowden cable core or the Bowden cable sheath can be achieved.

In one embodiment, the at least one deformation tab is undetachably connected after the deformation. The undetachable connection provides a particularly high fixing strength.

In order to solve the task, the invention also provides a method for installing the Bowden cable with fixing device, using the following installation steps:
1. Positioning of Bowden cable.
2. Adjusting and fixing of Bowden cable by a single translation movement.

The method only allowing adjusting and fixing of the Bowden cable using a single translation movement provides a particularly simple and quick installation.

In one embodiment, the method contains an additional installation step for attaching a fixing means prior to the second installation step. By installing the fixing means, a particularly easy and flexible installation is possible.

In one embodiment, the method provides an additional installation step after step two in the event that the adjustment has to be corrected, such step releasing the fixing means, allowing re-adjustment of the Bowden cable and re-installation of the fixing means. As mistakes by users during adjustment and installation can easily be remedied, a particularly easy and flexible installation is made possible.

An alternative method for installing the Bowden cable with fixing device contains the following installation steps:
1. Positioning of Bowden cable.
2. Adjusting and fixing of Bowden cable.
3. Fixing of Bowden cable by attaching a fixing means or deforming deformation tabs, in particular by using a forming tool.

A method allowing fixing of the Bowden cable by attaching a fixing means or reshaping deformation tabs, a particularly wide installation play can be provided, allowing a particularly easy and quick installation.

In one embodiment, the method provides the separate installation of the Bowden cable and of a connection means separated for installation as part of a first installation step. A particularly simple installation of the Bowden cable and of the connection means can thus be achieved.

The invention is explained with reference to example embodiment I (FIGS. 1 to 5), II (FIGS. 6 to 9) and III (FIGS. 10 to 12) shown in FIGS. 1 to 12, in which.

BRIEF DESCRIPTION OF THE DRAWINGS

DETAILED DESCRIPTION OF THE DRAWINGS

Figure 1:
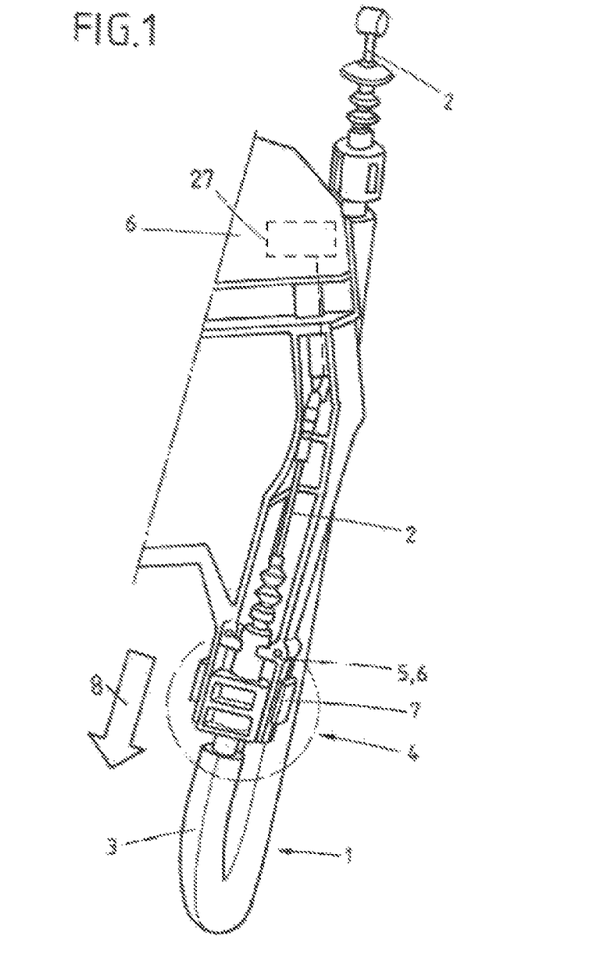
FIG. 1: shows a section of the system including the Bowden cable.

FIG. 1 shows a section of the system with a Bowden cable 1 (example I) with a fixing device 4, in which the Bowden cable 1 is used in a motor vehicle latch of a door or flap containing a locking mechanism 27, comprising a catch and at least a pawl for retaining the catch in a main ratchet position and in a pre-ratchet position by means of a force or longitudinal movement being transferred from a drive onto a closing aid for moving the catch from the pre-ratchet position into the main ratchet position.

FIG. 1 only shows the connection to the connection parts 5 on one side of the Bowden cable 1. The connection and connection parts are hidden on the other side. FIG. 1 thus shows a Bowden cable 1 in which only one end of the Bowden cable core 2 is connected to the connection part 5 (covered by the housing 6 in FIG. 1) and in which only one end of the Bowden cable sheath 3 is connected to the housing 6 as a connection part.

Figure 2:
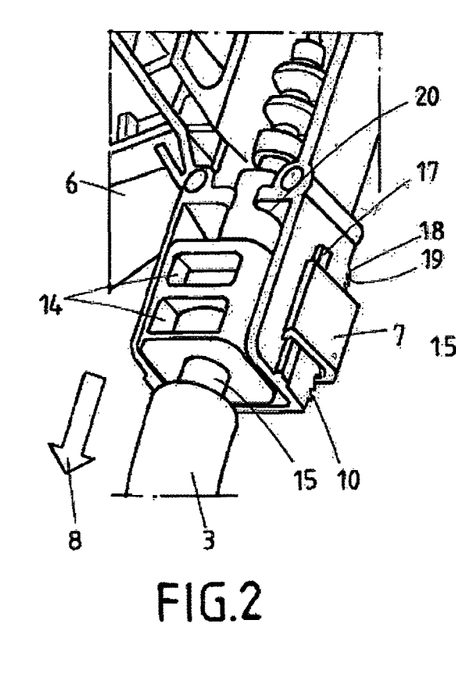
FIG. 2: shows a fixing device with the fixing means (front).

The Bowden cable 1 shown in FIG. 1 (example embodiment I) contains a fixing device 4 in which a fixing means 7 can be attached perpendicularly from the rear to the tensioning direction 8. FIGS. 2. 3. 4 and 5 show details of this example embodiment I. FIGS. 6. 7. 8 and 9 show detailed views of the example embodiment II of a Bowden cable 1 with fixing device 4 in which the fixing means 7 can be installed by the user perpendicularly from the front in relation to the tensioning direction 8. Depending on accessibility, installation space and selected installation method, the example embodiment I or II can be advantageous for a particularly simple installation.

Figure 5:
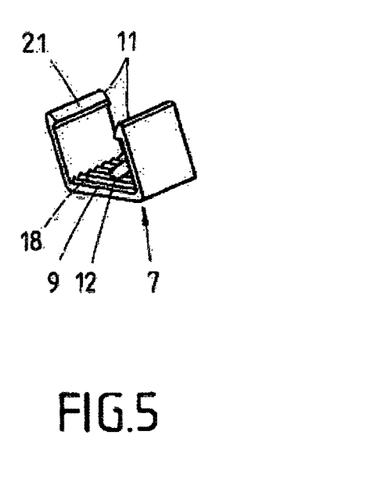
FIG. 5: fixing means.
Figure 6:
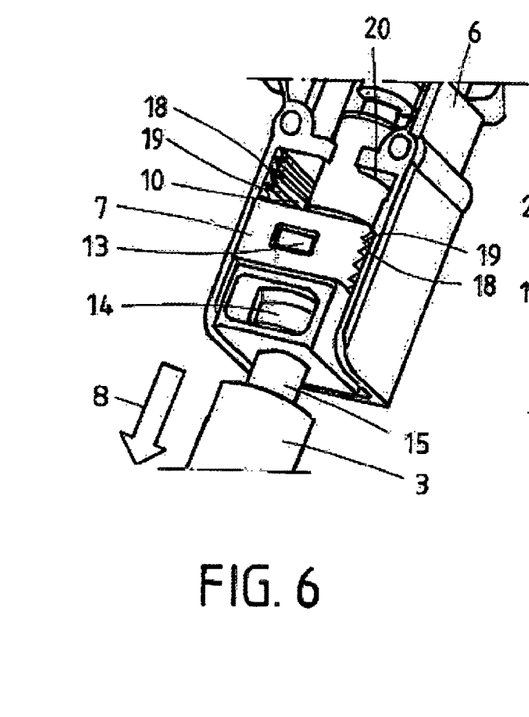
FIG. 6: fixing device with fixing means (front).
Figure 7:
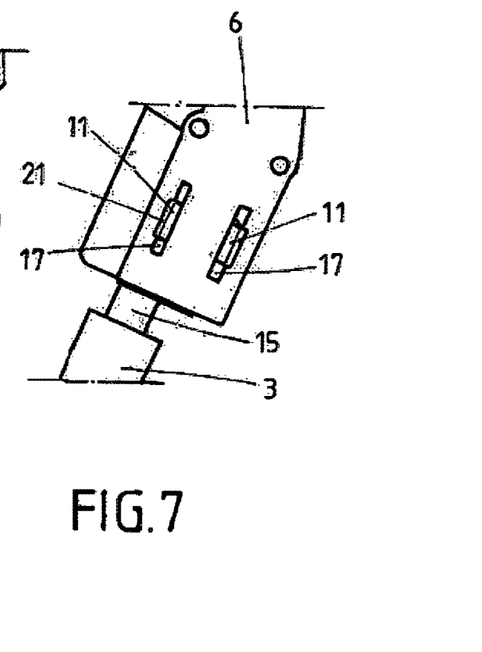
FIG. 7: fixing device with fixing means (rear).
Figures 8, 9:
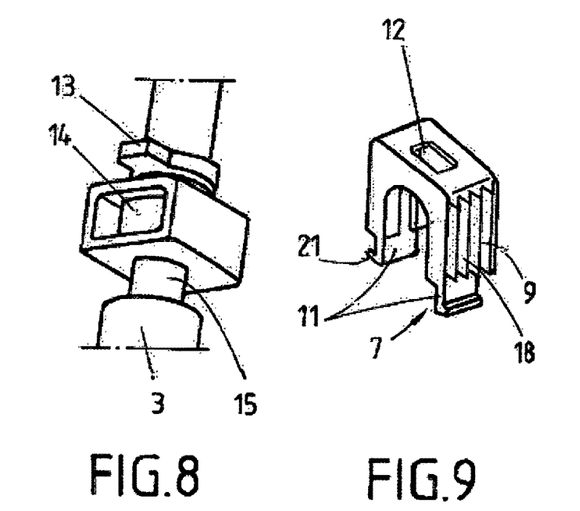
FIG. 8: Bowden cable sheath
FIG. 9: fixing means.

The fixing means 7 is designed as a single-piece plastic injection molding part, containing saw-tooth shaped detent cogs 9, two detent hooks 11 and a detent opening 12 (see FIGS. 5 and 9).

Figure 4:
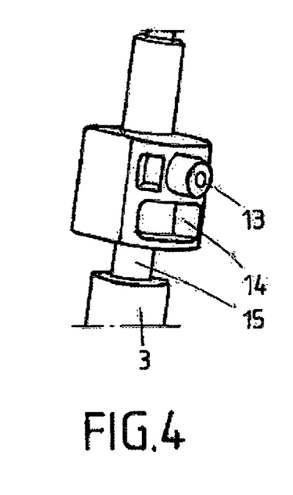
FIG. 4: Bowden cable sheath.

The Bowden cable sheath 3 contains a retaining lug 13 in the area of the fixing device 4 for a positive connection with the detent opening 12 in tensioning direction 8 or translation direction, a connection means 14 in form of a recess for connecting a tool and for adjusting the Bowden cable 1 manually or with the aid of a tool as well as a recess 15 on the Bowden cable sheath increasing the flexibility of the Bowden cable at the transition to the area of the fixing device 4 (see FIGS. 4 and 8).

In the area of the fixing device 4, the housing 6 contains a cylindrical opening 20 allowing a particularly easy installation of the Bowden cable and a guide 17 for retaining the detent hook 11 and guidance in the translation direction. In the example embodiment I this guide 17 consists of a projection with phase in the housing 6 (see FIG. 3). In the example embodiment II this guide 17 is a groove or slot in the housing 6 (see FIG. 7). A ratchet profile 10 is also provided or formed in the housing 6, facing the detent cogs 9 of the fixing means 7 in the attached state (see FIGS. 2, 3 and 6).

Figure 3:
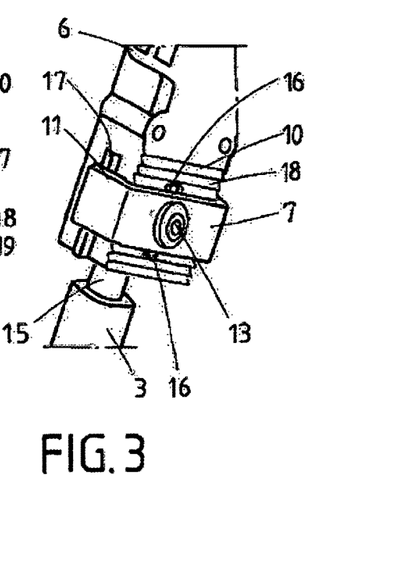
FIG. 3: shows a fixing device with the fixing means (rear).

The detent cogs 9 and the ratchet profile 10 have a saw-tooth shape and contain a sliding leg 18 with a small incline and a detent leg 19 with a steep incline. The sliding leg 18 and the detent leg 19 of the detent cogs 9 and of the ratchet profile 10 are designed in such a way that in case of a translation movement of the fixing means 7 in tensioning direction 8, sliding is made possible and that the detent cogs 9 engage with the ratchet profile 10 in tensioning direction 8. The detent hooks 11 held by the guide 17 ensure a reliably fixing of the fixing means 7 in such an engaged position. The user can thus adjust and simultaneously fix the Bowden cable using a single translation movement of the Bowden cable sheaths in tensioning direction.

The detent hook 11 contains a phase 21 as a result of which the detent hook 11 can be particularly easily engaged in the guide 17. The plastic material of the detent hook 11 has been selected in such a way that an elastic deformation of the detent hook 11 is made possible, allowing the detent hook 11 to be repeatedly attached and also detached again to the guide 17 without destruction.

This allows several installation and adjustment options of the Bowden cable 1 and fixing of the Bowden cable 1 by the fixing device 4.

The Bowden cable 1 comprising the Bowden cable core 2 and the Bowden cable sheath 3 is first of all placed in position. In relation to the section displayed in the figure, showing the connected ends of the Bowden cable, this means insertion of the Bowden cable sheath 3 including the enclosed Bowden cable core 2 into the cylindrical opening 20 of the housing 6 and connecting the Bowden cable core 2 to the connection part, covered by the housing 6 in FIG. 1.

Next, the Bowden cable 1 can either be adjusted and fixed by attaching the fixing means 7 and by a single translation movement of the Bowden cable sheath 3 in the tensioning direction 8 or the Bowden cable is first adjusted by a translation movement and is then fixed by attaching the fixing means 7. The latter option allows a translation movement in both directions along a straight parallel to the tensioning direction.

Where required, a correction of the setting is possible in both of the above options. This is achieved by releasing the fixing means 7, readjusting the Bowden cable 1 using a translation movement and finally reattaching the fixing means 7.

Figure 10:
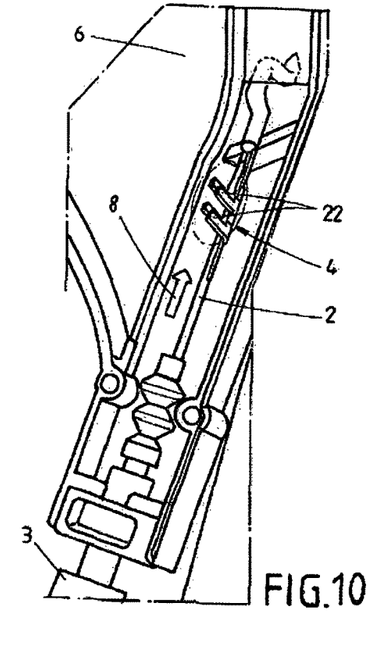
FIG. 10: fixing device before fixing.
Figure 11:
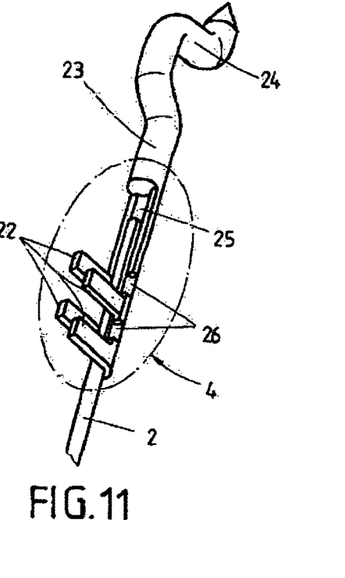
FIG. 11: fixing device before fixing (detailed view)
Figure 12:
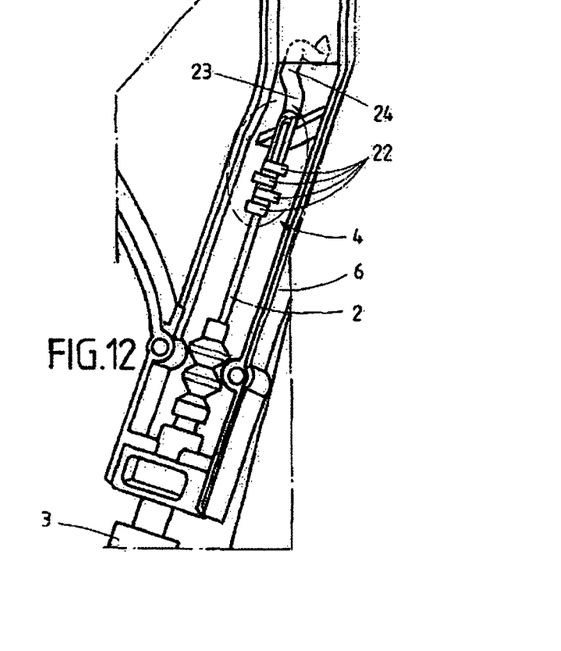
FIG. 12: fixing device after fixing.

FIG. 10 shows a Bowden cable 1 (example embodiment III) with a fixing device 4, containing four deformation tabs 22 for fixing the setting of the Bowden cable 1. FIGS. 10 and 11 show the Bowden cable 1 in an unfixed state and FIG. 12 shows it in a fixed state with bent deformation tabs 22.

The Bowden cable 1 contains a connection means 23 separated from the Bowden cable core 2 for the installation with a curved, hook-shaped end 24, only shown partly in FIG. 11.

As the connection means 23 and the Bowden cable core 2 are separated for installation, the Bowden cable core 2 and the end 24 can be installed separately and therefore in a particularly simple manner.

After installation and tying up the ends, the Bowden cable core 2 is placed in a recess 25 in the area of the fixing device 4, having essentially the same radius as the Bowden cable core 2 to be connected. As a result, the Bowden cable core 2 can be subjected to a particularly easy translatory movement or tensioned in tensioning direction for adjustment. In the area of the recess 25, the connection means 23 is designed as a half shell as an inspection window for displaying the relative position of the Bowden cable core 2 to the connection means 23 or to the end 24. This allows a particularly simple adjustment by the user.

The deformation tabs 22 are arranged or formed in the connection means 23 as a single piece and tangentially to the recess 25, parallel to each other and offset on both sides of the recess 25 (see FIG. 11). The connection means 23 is made of metal. As a result of this arrangement of the deformation tabs 22 the Bowden cable core 2 can be particularly easily inserted in the connection means 23 and subsequently connected with a high level of strength due to the contact force of the plastically deformed or bent over deformation tabs 22.

The seat 26 of the connection means 23 allowing anchoring of the deformation tabs 22 after deforming can prevent a translation movement of the deformation tabs 22 after deforming and offers a particularly connection strength between the connection means 23 and the Bowden cable core 2 as a result of a greater contact surface.

The Bowden cable 1 of example embodiment III also allows one of the above methods for adjusting and fixing the Bowden cable 1 by means of the fixing device 4.

The Bowden cable 1 comprising the Bowden cable core 2, a separate connection means 23 and the Bowden cable sheath 3, is installed first.

Next, the Bowden cable 1 is adjusted by a translation movement and is then fixed by deforming of the deformation tabs 22 of the fixing means 7, with a translation movement along a straight parallel to the tensioning direction being possible in both directions.

The invention claimed is:
1. A motor vehicle latch comprising:
   a locking mechanism comprising a locking housing, a catch and at least one pawl, mounted on the locking housing, for locking said catch in a main ratchet position and in a pre-ratchet position,
   a closing aid for moving the catch from the pre-ratchet position to the main ratchet position,
   a Bowden cable comprising a Bowden cable core and a Bowden cable sheath, the closing aid is configured to be operatively connected to a first end of the Bowden cable sheath, said locking housing comprising a connection part that is configured to receive and connected an opposite end of the Bowden cable sheath to the locking housing, the connection part defining a ratchet profile, a fixing device movably mounted to the connection part, the fixing device defining at least one detent cog that interconnects with the ratchet profile on the connection part, wherein, the Bowden cable sheath contains a connection device, which is received into an opening on the fixing device, for connecting a tool, so as to move the at least one cog of the fixing device with respect to the ratchet profile of the connection part, to a desired position in order to adjust the position of the Bowden cable.

2. The motor vehicle latch according to claim 1, wherein the adjusting and fixing of the Bowden cable can be achieved by a single translation movement in a tensioning direction.

3. The motor vehicle latch according to claim 2, wherein the fixing device has at least one detent hook for fixing the adjustment of the Bowden cable, and wherein the connecting part has a guide for retaining the detent hooks and guiding in a translation direction.

4. The motor vehicle latch according to claim 3, wherein the fixing device contains a fixing means that is releasably attached perpendicularly to the tensioning direction in a translation direction with a positive connection to the Bowden cable core or the Bowden cable sheath.

5. The motor vehicle latch according to claim 4, wherein at least one detent cog and/or at least one detent hook are arranged on the fixing means.

6. The motor vehicle latch according to claim 2, wherein the detent cog and/or the ratchet profile have a saw-tooth shape in such a way that the translation movement is only possible in a tensioning direction.

7. The motor vehicle latch according to claim 2, wherein a guide for retaining the detent hooks and guiding in a translation direction are provided in a connection part.

8. The motor vehicle latch according to claim 1, wherein the at least one connection devices for connecting a tool for adjustment of the Bowden cable is in the form of a recess.

9. The motor vehicle latch according to claim 1, wherein the fixing device contains a fixing means consisting of a single piece, wherein the fixing means is releasably attached perpendicularly to the tensioning direction with a positive connection to the Bowden cable core or the Bowden cable sheath by a retaining lug and respective detent opening.

10. A method for installing a motor vehicle latch according to claim 1, wherein the installation is carried out by:
in a first step, positioning the Bowden cable relatively to the connection part; and
in a second step, adjusting, tensioning and fixing the Bowden cable relatively to the connection part by conducting a single translation movement.

11. Method according to claim 10, wherein the motor vehicle latch is formed according to claim 6, prior to the second installation step, the method further comprises an additional installation step for attaching a fixing means to the Bowden cable sheath.

12. Method according to claim 11, wherein after step two, the adjustment can be corrected by carrying out the additional installation steps
releasing the fixing means,
readjusting the Bowden cable and
reattaching the fixing means.

* * * * *